United States Patent [19]

Immonen

[11] 4,077,733
[45] Mar. 7, 1978

[54] DEVICE FOR REMOVING THE WEARING SURFACE OF A TIRE

[76] Inventor: Kauko Ilmari Immonen, Kirvesniemi, 78800 Varkaus 80, Finland

[21] Appl. No.: 741,670

[22] Filed: Nov. 15, 1976

[51] Int. Cl.² .................. B26D 1/12; B23D 71/00; B29H 21/08; B27G 13/00
[52] U.S. Cl. .................................. 407/52; 29/78; 157/13; 144/227; 241/221; 407/113
[58] Field of Search ............ 29/76, 78, 105 R, 105 A, 29/95 R; 144/227, 230, 226, 232, 236; 241/221, 222, 294; 157/13

[56] References Cited

U.S. PATENT DOCUMENTS

| 901,681 | 10/1908 | Collet ................................ 29/105 X |
| 1,971,428 | 8/1934 | Riordan ................................ 29/78 |
| 2,183,082 | 12/1939 | Montagne ............................... 29/78 |
| 3,604,084 | 9/1971 | Krieger et al. ....................... 157/13 |

FOREIGN PATENT DOCUMENTS

| 430,673 | 2/1948 | Italy ..................................... 144/227 |
| 699,693 | 11/1953 | United Kingdom ..................... 29/78 |
| 234,941 | 6/1925 | United Kingdom ..................... 29/78 |

*Primary Examiner*—Harrison L. Hinson
*Attorney, Agent, or Firm*—Allan R. Fowler

[57] ABSTRACT

A device for removing the wearing surface of a tire before resurfacing includes a pair of disks detachably fixed together and having a common peripheral groove of partial circular cross-section. A number of ring-shaped cutting bits having cutting edges at each end, each formed having a number of outer surface grooves parallel to the ring axis for causing a rough cut, are equally spaced around the disks in the peripheral groove, with part of the ring cutting edges exposed. When the disks are fixed together, the rings are clamped in the peripheral groove, secure holding of slightly different sized rings being enabled by slots in the disk circumferences which form sector parts each holding two cutting bits. Each ring may be formed with an outer, encircling groove, enabling the rings to be strapped to the disks for additional holding security. Symmetrical ring cutting edges permits the disks to be rotated in either direction for cutting, disk rotation being at right angles to the direction of tire rotation and disk rotational speed being preferably ten times tire rotational speed. Material, transversely removed from the tire in a slicing action, is discharged through the open center of the rings, air flow through the open centers providing air cooling. As exposed bit cutting edges become worn, the bits are turned in the disk groove to expose new cutting edge portions; rings are quickly replaced by loosening the two disks. A variation is described in which the bits are mounted in peripheral disk sockets, turning of the bits in the sockets varying the cutting angle of the cutting edges.

2 Claims, 4 Drawing Figures

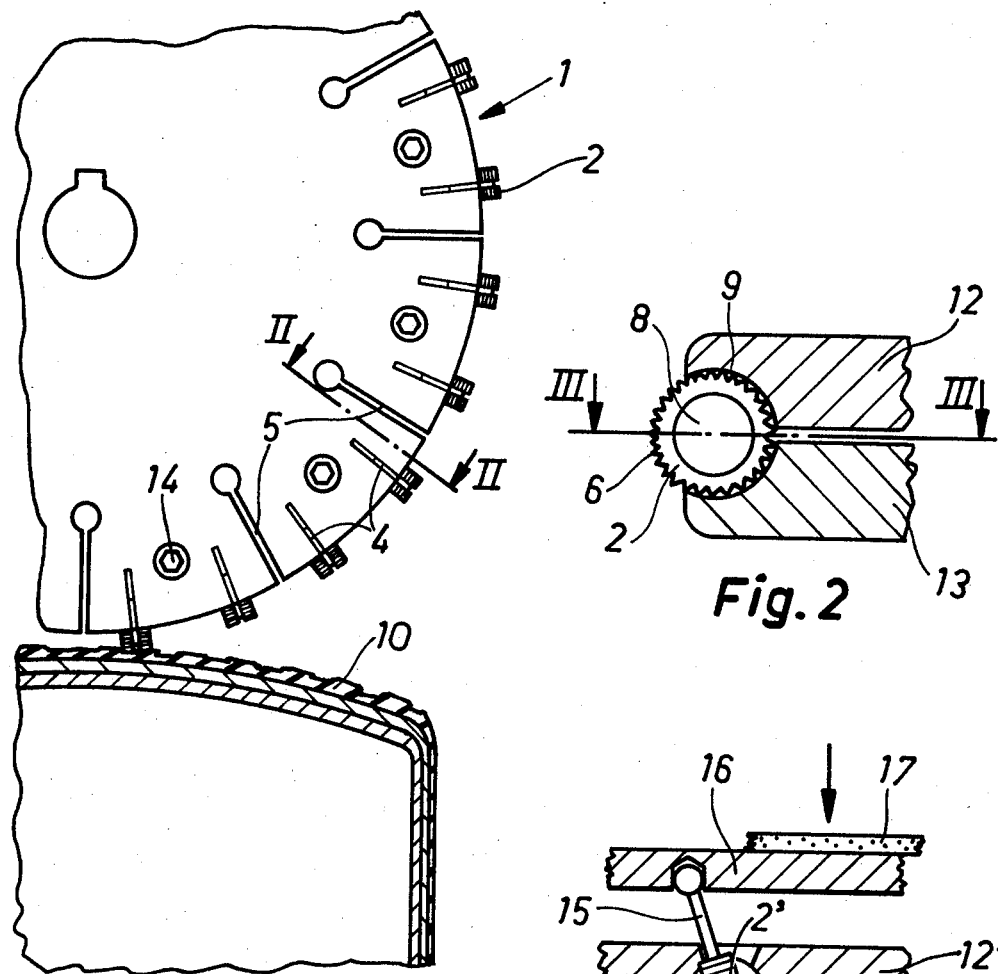
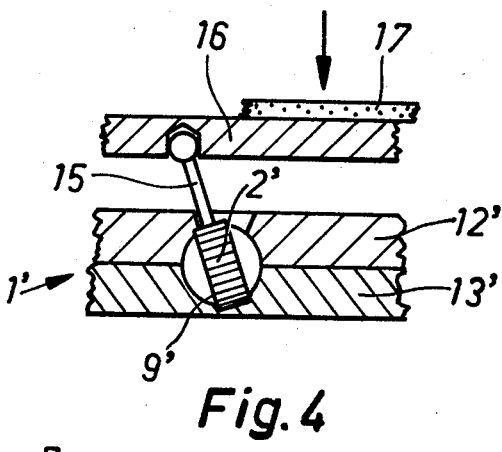
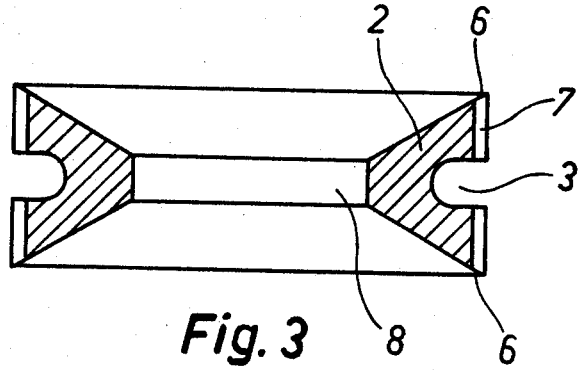

DEVICE FOR REMOVING THE WEARING SURFACE OF A TIRE

The present invention concerns a device for removing the wearing surface of a tire, comprising a tire fixing member, which rotates the tire if need be, and a rotating cutting member shaped like a disk and on the circumference of which cutting bits have been affixed.

Devices of this kind are used for removing the wearing surface of vehicle tires meant to be resurfaced, the new wearing surface being affixed with the aid of a cement in place of the wearing surface that has been removed. A device of this kind is known in prior art e.g. through the German publicizing print No. 2 429 145. In said device, in depressions on the periphery of a disk disk-shaped cutting bits have been affixed with the aid of wedge pieces that can be tightened with the aid of screws. This device of prior art is encumbered by the following drawbacks. It features poor arrangements for disposal of the chips that are removed. This is associated with a great elevation of temperature, with consequent risk of blocking as the overheated rubber material tends to beome vulcanized to adhere to the depression in front of the cutting bit. Servicing of the device is slow work because of the inconvenient dismounting and replacing of bits, and in addition it is not possible in this device to adjust the position of the bits, that is their cutting angle. The cut is completely smooth, although professionals usually believe that the wearing surface will stick better to a rough surface. It has furthermore been suggested that the device should be used in a direction longitudinal to the wearing surface of the tire, whereby grooves paralleling the periphery of the tire are produced in the surface upon which the new surface will be fixed. These grooves interfere with the degassing that has to be carried out in connection with the affixing of the new surface. Gas inclusions entrained under the surfacing usually cause premature loosening of the surface.

The object of the present invention is to afford an improved device of the type mentioned, by the aid of which the wearing surface of a tire can be removed with high speed, with low energy consumption and without detriment from heating.

This aim is achieved by the aid of the invention in that the cutting bits consist of rings or partial rings with sharp edges.

The cutting edges of the ring-shaped cutting bits perform a slicing cut, whereby the wearing surface is cut away in rather large pieces, which can depart through the central hole of the ring. The material that is being cut is not subjected to any powerful abrasion nor deformations resulting from pressure, whereby there is no substantial heating. It is further noted that the air flow has good access through the cutting ring to cool the work.

In a favourable embodiment of the invention the cutting member consists of two disks intended to be fixed to each other, whereby the cutting bits will be held by form fit in the groove on the peripheral face of the disks. Hereby, when the bits have become dull, all the bits may be rapidly and with ease exchanged for new ones, or the rings may be rotated, whereby the dulled bits moves into the fixing groove and from the fixing groove a new sharp edge emerges.

The invention is more closely described in the following with reference to the attached drawing, wherein:

FIG. 1 presents part of a disk of the invention and of the tire which is being worked on, in cross section;

FIG. 2 shows the section carried along the line II—II in FIG. 1, on an enlarged scale;

FIG. 3 shows the section of the ring-shaped cutting bit, carried along the line III—III in FIG. 2, on a further enlarged scale; and FIG. 4 is a sectioned partial view presenting another embodiment of the invention, wherein the cutting angle of the cutting bits has been arranged to be adjustable.

In the case depicted in FIG. 1, the cutting disk 1 rotates at right angles to the direction of rotation of the tire 10. The cutting disk 1 consist of two disks 12 and 13 mounted side by side and affixed to each other by screws 14. The peripheral faces of the disks 12 and 13 have been so shaped that between their rims remains a groove 9 having a cross section with the form of a partial circle. In this groove ring-shaped cutting bits 2 have been disposed, which have been tightly impacted between the disks 12 and 13 by the aid of screws 14. For increased security of their fixing, the cutting ring 2 has on its outer side an encircling groove 3, which is entered by the strips 4 on the disks 12 and 13. In order that all cutting bits 2 might be positively impacted between the disks 12 and 13 in spite of their dimensional differences due to manufacturing tolerances, slits 5 have been provided on the circumference of the disks 12 and 13 to separate sector parts, each of which contains two cutting bits 2 and one fixing screw 14.

Both edges of the cutting ring 2 serve as cutting bits 6, whereby the disk 1 may be rotated in either direction. The disk 1 may be provided in a manner known in prior art with a reversing mechanism, the reversing of direction taking place over the center of the tire and the cutting always being towards the outer edge of the tire. To this purpose the disk 1 has been fitted with a mechanism not depicted, to be displaceable in the transverse direction of the tire. In view of producing a roughened surface after cutting, the ring 2 has on its outer surface, grooves 7 paralleling its axis. The cutting grooves produced by the rings 2 as well as the roughening grooves produced by the roughenings 7 are transversal to the tire and therefore they do not interfere with the degassing carried out in connection with the resurfacing of the tire.

As the cutting disk 1 rotates, the cutting edges 6 of the cutting ring 2 cut from the wearing surface strip-shaped pieces, which depart through the aperture 8 of the cutting ring 2. With a speed of the disk 1 about 2000 to 3000 r.p.m. the risk of heating of the cut rubber is extremely high. When cutting rings according to the invention are used, the cutting process as well as the chip removal will be ideal, in addition to which the cutting bits are cooled by the air flowing through the aperture 8, and no detrimental heating will occur. It follows that the work is fast, since no interruptions for cooling are necessary, nor for removal of the rubber mass that has been heated and vulcanized to adhere to and clog the cutting bits.

The cutting bits 2 may be made of sintered hard metal, or ceramic bits may be used as well.

FIG. 4 displays another embodiment of the invention, wherein the cutting angle of the cutting ring 2' has been arranged to be adjustable or even to be automatically changeable when the direction of rotation of the disk 1' is reversed. In this case, too, the disk 1' may consist of two disks 12' and 13' fixed against each other and into which appropriate receiving sockets 9' have been machined for the cutting rings 2'. From the cutting ring 2' an arm 15 extends through an aperture in the disk 12', its end being pivotally connected with a third disk 16. The disk 16 rotates along with the disk 1', but it has the freedom of movement through a given angle with reference to the disk 1'. By means of a friction plate 17, the turning of the disk 16 through the said angle with reference to the disk 1' may be caused every time when the rotation of the disk 1' is reversed. It is possible to use instead of the friction plate 17, a fixed setting between the disks 1' and 16 so that the cutting angle of the cutting ring 2 may be adjusted to any desired value. Such fixed setting is possible in practice owing to the fact that it has been found that the device of the invention may be used to machine a tire without periodic changes of the direction of rotation and yet there is no risk of damage to the supporting structures of the tire, such as the radial ply course.

Although most favourably the fixing of the cutting rings 2 is between two disks 12, 13, the fixing may also be accomplished by means of a hoop passed through the apertures 8 and which urges the rings into a groove on the outer circumference of the unitary disk.

Generally considered, the speed of rotation of the disk 1 is about ten times that of the tire 10.

It is not absolutely necessary that the cutting rings have the shape of closed rings: cutting bits shaped like part of the ring, or like the letter C, may also be used. The shape of the rings need not be circular: it may as well be oval, for instance.

What is claimed is:

1. A device for removing the wearing surface of a tire, which comprises a disc-shaped cutting member formed of two discs detachably joined to each other, the discs having means defining a groove around the periphery of the cutting member and including a number of tire surface cutting bits disposed in the cutting member groove in spaced relationship around the member and being held in the cutting member groove by clamping action when the two discs are joined together;

the cutting bits each being formed of at least a partial ring having sharp cutting edges, the bits being held in the cutting member groove with portions of the cutting edges exposed, the exposed cutting edges being adapted to cut tire wearing surfaces upon engagement with a tire rotated relative to the device, the rings including means defining peripheral grooves thereabout, the device further including bit retaining strips fastened to the cutting member and passing around the bits in the bit grooves for additionally retaining the bits in the cutting member peripheral groove.

2. The device according to claim 1, characterized in that the two discs are formed having means defining a number of radial slits at the circumference thereof to divide edges of the disc into separate sector parts, each sector part containing at least one of the cutting bits and each sector having means for joining the discs together, the cutting bits being thereby positively held between the discs in spite of any dimensional differences due to manufacturing tolerances.

* * * * *